United States Patent Office 2,774,070
Patented Dec. 11, 1956

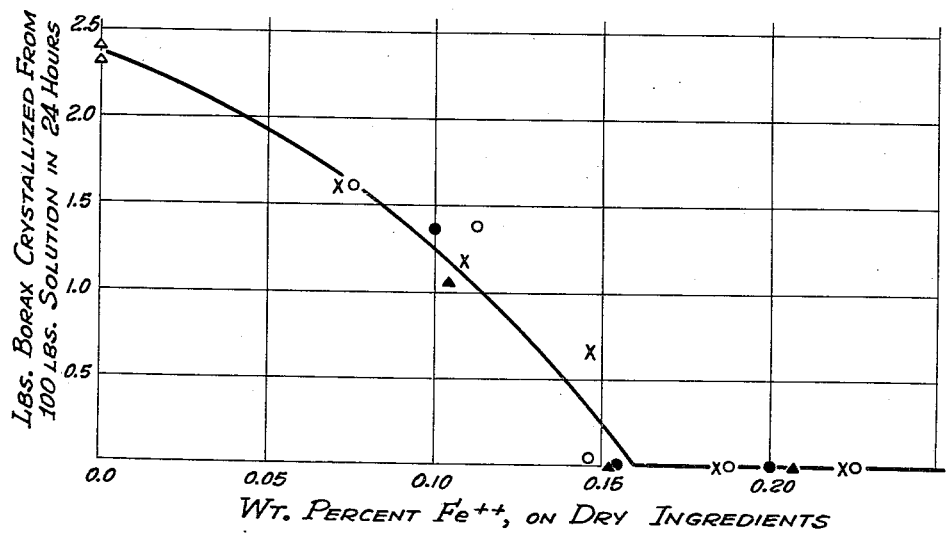

2,774,070
STABILIZATION OF BORAX SUPERSATURATION IN SOLUTIONS

Donald S. Taylor, Long Beach, and George A. Connell, Los Angeles, Calif., assignors, by mesne assignments, to United States Borax & Chemical Corporation Application April 10, 1953, Serial No. 347,892

5 Claims. (Cl. 23—59)

This invention has to do generally with the stabilization of solutions that are supersaturated with respect to borax.

The phenomenon of supersaturation is particularly common in the general system $Na_2O$—$B_2O_3$—$H_2O$, with or without other solutes. A metastable state of supersaturation is frequently encountered, in which an excess of borate will stay in solution almost indefinitely in the absence of appropriate seed crystals. In some cases even in the presence of seed crystals the supersaturation is quite persistent, and breaks relatively slowly.

It has been discovered that certain substances, when present in solutions supersaturated with respect to borax, have a strong tendency to stabilize the state of supersaturation. Such stabilizing agents permit a more extreme degree of supersaturation to be effectively attained and utilized, other conditions being the same; and they may extend almost indefinitely a condition of supersaturation that would otherwise be relatively short lived.

The most marked effect, and in many respects the most frequently useful, is the change that such agents produce in the behavior of moderately supersaturated solutions in the presence of seed crystals. In many instances growth of seed crystals in such solutions is substantially completely inhibited, even at concentrations that would normally produce fairly rapid precipitation.

The substances that have been found to have this remarkable property of stabilizing solutions that are supersaturated with respect to borax include ferric iron, which is most readily introduced into solutions of borates by dissolving a ferrous salt and providing in the solution an oxidizing agent capable of oxidizing the ferrous ion to ferric ion. Under many practical conditions dissolved atmospheric oxygen is an effective oxidizing agent. Or any suitable oxidizing agent may be added, such, for example, as potassium dichromate, potassium permanganate and the like. The ferric iron may be in the form of free ferric ion, or combined as ferric hydroxide, depending primarily upon the pH of the solution. At relatively high pH the solubility of ferric hydroxide is extremely low in absence of other solutes, and is quite low even in concentrated solutions of borates. Considerable stabilization is still obtained under those conditions, and is probably caused primarily either by the small concentration of ferric hydroxide in solution or by the very fine ferric hydroxide precipitate.

Aluminum, cupric, chromic and, to a lesser extent, zinc, calcium and magnesium ions also act as stabilizing agents for excess borax in solution.

In addition to the inorganic substances mentioned, anionic organic substances having surface active properties have been found to be effective stabilizing agents. Such surface active substances are described and claimed in our copending patent application, Serial No. 117,806, filed September 26, 1949, now Patent 2,662,810, of which the present application is a continuation in part.

An example of the practical utilization of the invention is provided by the problem of preparing solutions of sodium borate for use in controlling weeds. Such solutions are ordinarily made up as needed from solid compositions. It is desirable in general to employ a concentration of borate in solution that is close to, or even somewhat above, the normal solubility, in order to apply a maximum quantity of borate per pound of solution. By providing a stabilizing agent in suitable quantity in the solution, it becomes feasible to employ solutions that are very appreciably supersaturated with respect to borax. In that way the invention permits applying a given quantity of borate more cheaply and conveniently, since less water is consumed and less bulk of solution needs to be handled.

That procedure is particularly useful when the borate composition is of the type described and claimed in the copending patent application of George A. Connell entitled "Supersaturated Borax Solutions and Methods and Compositions for Producing Same," Serial No. 117,878, filed September 26, 1949, now Patent 2,643,947. As is there described in full detail, it has been discovered that a mixture of sodium tetraborate and boric acid (or sodium pentaborate) having a suitable value of the molar ratio of $Na_2O/B_2O_3$ can be dissolved directly in water to yield a supersaturated solution. The concentration obtainable may be equal to or greater than the maximum of the "pentaborate peak" of the normal solubility curve, which occurs typically at a value of the sodium to boron ratio of from about 0.15 to about 0.25, depending upon conditions such as temperature and presence of other solutes.

An important feature of that discovery is that the actual sodium to boron ratio of the ingredients dissolved (and of the resulting solution) need not coincide with the ratio at the peak of the solubility curve, but can be considerably higher, and the concentration of the resulting solution may still be equal to or greater than that at the maximum of the curve. Such direct solution of sodium tetraborate to produce a supersaturated solution can be obtained by using tetraborate containing five mols of water of hydration or less.

An advantage of that discovery in preparing such solutions for weed control purposes is that the variation with temperature of the sodium to boron ratio at which the solubility peak occurs can be largely neglected. A dry composition of the type described suitable for solution in water at one temperature can thus be dissolved directly to the same concentration even in considerably colder water. Under the latter conditions a supersaturated solution ordinarily results. The practical advantage of being able to stabilize that supersaturation by addition of a simple and relatively inexpensive stabilizing agent in accordance with the present invention is obvious.

The amount of any particular stabilizing agent that should be used in any given instance depends upon the conditions of use, for example the length of time that supersaturation must be effectively maintained; and depends particularly upon the degree of the supersaturation. The latter factor is difficult to define usefully in precise terms, because of the wide variation of the normal solubility as a function of the ratio of $Na_2O_3$ to $B_2O_3$ in the solution. Because of the nature of that variation, the tendency of borax to crystallize from a supersaturated solution depends not only upon the percentage excess of $B_2O_3$ in solution, but also upon the value of the ratio $Na_2O/B_2O_3$ and the behavior of the solubility curve in that region. The "pentaborate peak" of the normal solubility curve is one example of such rapid variation of solubility with variation of the $Na_2O/B_2O_3$ ratio.

Many of the agents mentioned exhibit a very considerable stabilizing effect when used in a concentration of 0.1 to 1% on the dry weight of the other solutes present. In some instances, and under some conditions, as much as 5%, or even more may be required to give the desired degree of stabilization.

A group of typical stabilizing effects, obtained under uniform conditions to be described, are illustrated graphically in the accompanying drawing. The solutions were made up by dissolving 1.5 lbs. of a dry mix per gallon of water, together with the indicated ferrous salt, at 10° C., yielding in every instance a solution supersaturated with respect to borax. The dry mix comprised 27.8% of $NaClO_3$ (an auxiliary weed killing agent) and 72.2% of boric acid and calcined borax in proportions to give a molar ratio $Na_2O/B_2O_3$ of 0.252. In all instances ferric iron was provided by supplying the indicated type of ferrous salt and allowing dissolved atmospheric oxygen to oxidize the ferrous iron to ferric. The amount of ferrous ion provided is shown as abscissa in terms of percent on the total of other solutes. Each solution was continuously agitated at 10° C., and the solution phase was analyzed at 1 hr. and at 24 hrs. The ordinates in the drawing represent the amount of borax that crystallized out of solution between those two analyses, expressed in pounds per 100 lbs. of solution.

The two points at the extreme left of the figure represent solutions to which no stabilizing agent was added. From those solutions 2.5 lbs. borax crystallized out per 100 lbs. of solution during 24 hrs. of continuous agitation at 10° C. Although that amount of crystallization did not necessarily remove all supersaturation from the solutions, it is sufficient to seriously interfere with use of such solutions. Moreover, it provides a rough indication of the degree of supersaturation existing in the solutions as originally prepared. The progressive stabilization of that supersaturation as more iron was provided in the solution is clearly shown by the progressively decreasing amount of borax crystallized out. When more than 0.15% ferrous ion (computed on the dry weight of the other solutes) was added, in the presence of an oxidizing agent (air), complete stabilization was obtained, and no crystallization of borax was observed under the particular experimental conditions employed. It is clear from the drawing that the detailed source of ferric iron is of minor importance compared to the available concentration. The results given in the drawing will serve as a guide in determining the amount of iron that should be provided under other conditions. In general, as the pH of the solution increases, and as the temperature decreases, the effectiveness of ferric iron as a stabilizer becomes less marked, perhaps largely because of the reduced solubility of ferric hydroxide.

Tables 1 and 2 give typical data on stabilizing effects obtained with certain agents other than iron, all at 10° C. In Table 1 the last column gives the amount of borax crystallizing from each solution, determined as just described for the solutions represented in the drawing. Solutions indicated as solution A were made with the same dry mix just described, except that the molar ratio $Na_2O/B_2O_3$ was 0.240, at the same dosage of 1.5 lbs. of dry mix per gallon of water. The compositions from which Solutions B and C were prepared comprised boric acid and calcined borax only, in proportions to give respective sodium to boron ratios of 0.250 and 0.253. Solutions D (Table 2) were made up with a uniform quantity of calcined borax only, and had a ratio of 0.5.

In Table 1 the degree of stabilization produced by the various additives may be judged either from the relative decrease of $B_2O_3$ concentration during 24 hrs. of continuous agitation, as compared to the corresponding decrease for solutions 1 and 4 without additives; or from a similar comparison of the amount of borax crystallizing out of solution during that period. The shift in $Na_2O/B_2O_3$ ratio is directly attributable to the removal from the solution of a solute (borax) having a higher ratio than the solution. It will be noted that solution 3 was completely stabilized, under the particular experimental conditions described.

In absence of stabilizing agents solution 6 in Table 2 reached a state of equilibrium after 24 hrs. Therefore the concentration of $B_2O_3$, determined after that time, represents the normal solubility at a sodium to boron ratio of 0.5. That value of the normal solubility provides a base from which the degree of stabilization produced by the iron and aluminum may be judged. The concentration of $B_2O_3$ after 24 hrs. in the presence of the stabilizing agent was more than 25% greater than the normal solubility at a $Na_2O/B_2O_3$ ratio of 0.5.

Tables 1 and 2 follow.

*Table I*

| No. | Solution | Additive Type | Additive Percent on dry mix | Percent $B_2O_3$ 1 hr. | Percent $B_2O_3$ 24 hr. | $Na_2O/B_2O_3$ 1 hr. | $Na_2O/B_2O_3$ 24 hr. | Borax crystallized 24 hrs., lb./100 lb. solution |
|---|---|---|---|---|---|---|---|---|
| 1 | A | None | | 5.93 | 5.61 | .238 | .220 | 0.99 |
| 2 | A | $Al_2(SO_4)_3.18H_2O$ | 0.74 | 5.83 | 5.73 | .235 | .227 | 0.37 |
| 3 | A | $CuSO_4.5H_2O$ | 0.74 | 5.89 | 5.90 | .236 | .236 | 0.00 |
| 4 | B | None | | 8.18 | 7.95 | .251 | .242 | 0.74 |
| 5 | C | Chromic Chloride | 0.74 | 8.35 | 8.30 | .251 | .250 | 0.18 |

*Table II*

| No. | Solution | Additive Type | Additive Percent on dry mix | Percent $B_2O_3$ after 24 hrs. |
|---|---|---|---|---|
| 6 | D | None | | 1.14 |
| 7 | D | $Al_2(SO_4)_3.18H_2O$ | 5.0 | 1.45 |
| 8 | D | $FeCl_2.2H_2O$ | 2.5 | 1.25 |

We claim:

1. The method of stabilizing a state of supersaturation with respect to borax in aqueous solution during a holding period of appreciable duration; said method comprising producing an aqueous solution that is substantially saturated with respect to borax, providing in the solution a stabilizing agent selected from the group consisting of ferric, cupric and chromic salts, the concentration of said stabilizing agent being greater than about one tenth percent on the dry weight of the other solutes present, and then holding the solution continuously during the said holding period under conditions for which the equilibrium solubility with respect to borax is less than the existing borax concentration of the solution by an amount that is insufficient, by virtue of the presence of the said stabilizing agent, to cause appreciable crystallization of borax.

2. The method defined in claim 1 and in which the said stabilizing agent is a ferric salt.

3. The method defined in claim 1 and in which the said stabilizing agent is a cupric salt.

4. The method defined in claim 1 and in which the said stabilizing agent is a chromic salt.

5. The method of stabilizing a state of supersaturation with respect to borax in aqueous solution during a holding period of appreciable duration; said method comprising producing an aqueous solution that is substantially saturated with respect to borax, providing in the solution a ferrous salt and an oxidizing agent capable of oxidizing the ferrous ion to ferric form, and then holding the solution continuously during the said holding period under conditions for which the equilibrium solubility with respect to borax is less than the existing borax concentration of the solution by an amount that is insufficient, by virtue of the presence of the dissolved ferric ion, to cause appreciable crystallization of borax.

References Cited in the file of this patent

UNITED STATES PATENTS

| | | |
|---|---|---|
| 1,812,347 | Kuhnert | June 30, 1931 |
| 2,089,557 | Jacobi | Aug. 10, 1937 |
| 2,662,810 | Taylor et al. | Dec. 15, 1953 |

OTHER REFERENCES

Teeple: "The Industrial Development of Searles Lake Brines," ACS Monograph Series No. 49 (1929), page 18. Published by Chemical Catalog Co., Inc., New York City.